(12) United States Patent
Feng et al.

(10) Patent No.: US 10,193,150 B2
(45) Date of Patent: Jan. 29, 2019

(54) LITHIUM ION SECONDARY BATTERY CATHODE MATERIAL, LITHIUM ION SECONDARY BATTERY CATHODE AND LITHIUM ION SECONDARY BATTERY THAT USE SAME, AND METHOD FOR MANUFACTURING LITHIUM ION SECONDARY BATTERY CATHODE MATERIAL

(71) Applicant: HITACHI METALS, LTD., Tokyo (JP)

(72) Inventors: Xiaoliang Feng, Tokyo (JP); Shuichi Takano, Tokyo (JP); Takashi Nakabayashi, Tokyo (JP); Akira Gunji, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 50 days.

(21) Appl. No.: 15/321,064

(22) PCT Filed: Jul. 3, 2015

(86) PCT No.: PCT/JP2015/069324
§ 371 (c)(1),
(2) Date: Dec. 21, 2016

(87) PCT Pub. No.: WO2016/006557
PCT Pub. Date: Jan. 14, 2016

(65) Prior Publication Data
US 2017/0155139 A1 Jun. 1, 2017

(30) Foreign Application Priority Data
Jul. 7, 2014 (JP) .................................. 2014-139891

(51) Int. Cl.
*H01M 4/485* (2010.01)
*H01M 4/505* (2010.01)
(Continued)

(52) U.S. Cl.
CPC ............ *H01M 4/485* (2013.01); *C01G 51/50* (2013.01); *C01G 53/50* (2013.01); *H01M 4/131* (2013.01);
(Continued)

(58) Field of Classification Search
None
See application file for complete search history.

(56) References Cited

U.S. PATENT DOCUMENTS

| | | | |
|---|---|---|---|
| 2006/0263690 A1* | 11/2006 | Suhara ................. | C01G 51/006 429/231.3 |
| 2010/0266904 A1* | 10/2010 | Jeon .................. | H01M 10/0525 429/330 |

(Continued)

FOREIGN PATENT DOCUMENTS

| | | |
|---|---|---|
| JP | 2009-205974 A | 9/2009 |
| JP | 2010-070427 A | 4/2010 |

(Continued)

OTHER PUBLICATIONS

The Extended European Search Report dated Jan. 4, 2018 for the European Application No. 15818616.3.

*Primary Examiner* — Wyatt P McConnell
(74) *Attorney, Agent, or Firm* — Volpe and Koenig, P.C.

(57) ABSTRACT

Provided are a cathode material for lithium ion secondary battery having excellent rate characteristics and cycle characteristics while a cathode active substance has high density, and a lithium ion secondary battery cathode and a lithium ion secondary battery that use the above cathode material. The cathode material for lithium ion secondary battery (1), represented by $Li_{1+x}M1_{1-x-y}M2_yO_2$ [where $-0.1 \leq x \leq 0.3$, $0 \leq y \leq 0.1$; M1 is Ni, Co, Mn; and M2 is Mg, Al, Ti, Zr, Mo, Nb, Fe, B], is an agglomerate including secondary particles (50, 60) both formed via aggregation of lithium metal composite oxide primary particles (10) having a layered (Continued)

structure. A mean porosity of the secondary particles having a particle size of more than 10 μm and equal to 50 μm or less is higher than that of the secondary particles having a particle size of 0.5 μm to 10 μm.

7 Claims, 3 Drawing Sheets

(51) Int. Cl.
| | |
|---|---|
| *H01M 4/525* | (2010.01) |
| *H01M 4/36* | (2006.01) |
| *H01M 10/0525* | (2010.01) |
| *C01G 51/00* | (2006.01) |
| *C01G 53/00* | (2006.01) |
| *H01M 4/131* | (2010.01) |
| *H01M 4/02* | (2006.01) |
| *C01G 45/12* | (2006.01) |

(52) U.S. Cl.
CPC ........... *H01M 4/362* (2013.01); *H01M 4/364* (2013.01); *H01M 4/505* (2013.01); *H01M 4/525* (2013.01); *H01M 10/0525* (2013.01); *C01G 45/1228* (2013.01); *C01P 2002/20* (2013.01); *C01P 2002/76* (2013.01); *C01P 2004/50* (2013.01); *C01P 2004/51* (2013.01); *C01P 2004/61* (2013.01); *C01P 2004/62* (2013.01); *C01P 2006/40* (2013.01); *H01M 2004/028* (2013.01); *Y02T 10/7011* (2013.01)

(56) References Cited

U.S. PATENT DOCUMENTS

| | | | |
|---|---|---|---|
| 2011/0206985 A1 | 8/2011 | Ishihara et al. | |
| 2012/0064403 A1* | 3/2012 | Kameda | H01M 4/587 |
| | | | 429/211 |
| 2013/0273435 A1* | 10/2013 | Leitner | H01M 4/602 |
| | | | 429/309 |
| 2014/0087265 A1 | 3/2014 | Yura et al. | |

FOREIGN PATENT DOCUMENTS

| | | |
|---|---|---|
| JP | 2011-175739 A | 9/2011 |
| JP | 2012-129070 A | 7/2012 |
| JP | 2012-221855 A | 11/2012 |
| WO | 2009/099158 A1 | 8/2009 |
| WO | 2013/084923 A1 | 6/2013 |

* cited by examiner

LITHIUM ION SECONDARY BATTERY CATHODE MATERIAL, LITHIUM ION SECONDARY BATTERY CATHODE AND LITHIUM ION SECONDARY BATTERY THAT USE SAME, AND METHOD FOR MANUFACTURING LITHIUM ION SECONDARY BATTERY CATHODE MATERIAL

FIELD OF INVENTION

The present invention relates to a lithium ion secondary battery cathode material, a lithium ion secondary battery cathode and a lithium ion secondary battery that use the same, and a method for manufacturing a lithium ion secondary battery cathode material.

BACKGROUND ART

A lithium ion secondary battery has characteristics of higher energy density and a smaller memory effect than other secondary batteries including a nickel-hydrogen battery and a nickel-cadmium battery. Hereby, the application of the lithium secondary battery is growing from a power supply for portable electronics such as a smartphone and a tablet terminal; a power supply for electric home appliances; a stationary power supply for power storage facility, an uninterruptible power supply system and a power leveling device; and up to a driving power supply for a ship, a train, a hybrid vehicle and an electric vehicle. Thus, further improvement in battery performance is demanded.

Among various applications of a lithium ion secondary battery, especially in the applications to a small sized power supply and a middle sized power supply for a vehicle or the like, reduction of an occupied battery volume is demanded, whereby demands for improving volume energy density of a cathode are growing. Therefore, a technique is proposed for improving packing density of a cathode active substance by appropriately controlling a particle size of the cathode active substance.

For example, Patent Document 1 discloses a method for manufacturing a lithium-containing composite oxide. This is a manufacturing method for a lithium-containing composite oxide represented by a general formula of $Li_wN_xM_yO_zF_a$ [where N is at least one kind of an element selected from a group of Ni, Co and Mn; M is at least one kind of an element selected from a group of a transition metal element other than Ni, Co and Mn, and Al, Sn and an alkaline earth metal; $0.9 \leq w \leq 1.3$, $0.9 \leq x \leq 2$, $0 \leq y \leq 0.1$, $1.9 \leq z \leq 4.1$, $0 \leq a < 0.05$].

Herein, the method includes the steps of: mixing granulated particles with a mean particle size of 10-40 μm containing at least an N element and made of primary particles with a mean particle size of 1 μm or less, crystallized particles with a mean particle size of 6 μm or less containing at least an N element, in which the weight rate of the granulated particles/the crystallized particles is 10/90-90/10, and a lithium compound so as to produce powder of the mixture; firing the resulting powder at 750-1250° C. under an oxygen-containing atmosphere; and thereby manufacturing a lithium-containing composite oxide.

Further Patent Document 2 discloses a cathode active substance for a non-aqueous electrolyte battery. The cathode active substance includes primary particles of a lithium composite oxide represented by an average composition of $Li_xCO_yNi_zM_{1-y-z}O_{b-a}X_a$ [where M is one kind of an element, or two or more kinds of elements selected from a group of boron (B), magnesium (Mg), aluminum (Al), silicon (Si), phosphor (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb) and antimony (Sb). X represents halogen. "x", "y", "z", "a" and "b" each represents a value satisfying relationships of $0.8 < x \leq 1.2$, $0 < y \leq 0.5$, $0.2 \leq z \leq 1.0$, $0.2 < y+z \leq 1.0$, $1.8 \leq b \leq 2.2$, $0 \leq a \leq 1.0$].

Alternatively, the cathode active substance includes secondary particles formed by aggregation of primary particles of a lithium composite oxide, a partial surface of the primary particles being covered with an electron conductive material. The lithium composite oxide is represented by an average composition of $Li_sM1_{1-t}M2_tPO_4$ [where M1 is one kind of an element, or two or more kinds of elements selected from a group of iron (Fe), manganese (Mn), cobalt (Co), nickel (Ni), copper (Cu), zinc (Zn) and magnesium (Mg). M2 is one kind of an element, or two or more kinds of elements selected from Group 2-Group 15 excluding M1. "s" and "t" each represents a value satisfying relationships of $0 \leq s \leq 1.2$, $0 \leq t \leq 1.0$].

Herein, a volume-based 50% mean particle size of the secondary particles measured by a laser diffraction/scattering method is in the range from 10 μm to 30 μm, a number-based 10% mean particle size is 3 μm or less, a number-based 50% mean particle size is 6 μm or less, and a number-based 90% mean particle size is in the range from 13 μm to 20 μm.

DOCUMENTS OF PRIOR ART

Patent Documents

Patent Document 1: Japanese Unexamined Patent Application Publication No. 2010-070427

Patent Document 1: Japanese Unexamined Patent Application Publication No. 2012-221855

SUMMARY OF INVENTION

Problems to be Solved by Invention

If volume energy density of a lithium ion secondary battery is improved, improvement in packing ability of a cathode active substance is required so as to increase electrode density. As shown in the technologies disclosed in Patent Documents 1 and 2, a combination use of particles with different particle sizes, or an increased pressure in the electrode press-forming may decrease a volume of voids formed among particles of a cathode active substance. This allows improvement in the packing density of the cathode active substance.

However, such decrease in the volume of voids among particles suppresses an electrolyte solution from being permeated through the voids, resulting in decrease in a volume of the electrolyte solution permeated inside the cathode active substance. In this case, lithium ions diffuse exclusively depending on an in-solid diffusion rate of the cathode active substance, which leads to deficient of lithium ions inside the cathode active substance at discharge. Accordingly, the higher a discharge rate becomes, the lower a discharge capacity becomes, causing a risk of deterioration of rate characteristics.

Meanwhile, a layered oxide represented by $LiMO_2$ (where M is an element such as Ni, Co, Mn or the like) has been earnestly developed for a cathode active substance used in a lithium ion secondary battery. The layered oxide is a lithium metal composite oxide having an α-NaFeO₂ type crustal structure, which is one of a promising cathode active substance having a relatively high charge-discharge capacity. However, such a lithium metal composite oxide shows a large volume change accompanying intercalation/de-intercalation of lithium ions. As a low-cost and high capacity layered oxide, a nickel based layered oxide such as LiNiO₂ is known, while such a nickel based layered oxide causes a crystal distortion especially by the Jahn-Teller effect and gas generation.

Hereby, when a volume of voids formed among particles of a cathode active substance like the above layered oxide is decreased, the cathode active substance packed in high density is incapable of following volume change caused accompanying charge-discharge operations. This phenomenon may cause a crack between respective particles made of primary particles or secondary particles, or inside the respective particles thereof. Further, repeated charge-discharge operations may develop such a crack, and therefore, when a number of particles having remarkably deteriorated electrochemical properties are formed, this may result in deterioration of charge-discharge cycle characteristics and volume energy density.

Accordingly, an object of the present invention is to provide a lithium ion secondary battery cathode material having not only excellent packing ability but also excellent rate characteristics and charge-discharge cycle characteristics, a lithium ion secondary battery cathode and a lithium ion secondary battery that use said cathode material. Further, another object is to provide a method for manufacturing a lithium ion secondary battery cathode material.

Means for Solving Problems

A lithium ion secondary battery cathode material (or called a cathode material for lithium ion secondary battery) of the present invention for solving the above drawbacks is represented by the following composition formula (I).

[where x is a number satisfying a relationship of $-0.1 \leq x \leq 0.3$; y is a number satisfying a relationship of $0 \leq y \leq 0.1$; M1 is at least one kind of an element selected from a group of Ni, Co, Mn; M2 is at least one kind of an element selected from a group of Mg, Al, Ti, Zr, Mo, Nb, Fe, B]. Further, the lithium ion secondary battery cathode material is an agglomerate including secondary particles formed by aggregation of primary particles of a lithium metal composite oxide having a layered structure.

When the secondary particles are analyzed by a laser diffraction/scattering type particle size distribution measurement, a particle size (D10) corresponding to 10% in volume-based cumulative particle size distribution is in the range from 0.5 μm to 10 μm. Further, a particle size (D90) corresponding to 90% in volume-based cumulative particle size distribution is in the range of more than 10 μm and equal to 50 μm or less. Herein, a mean porosity of the secondary particles having a particle size in the range of more than 10 μm and equal to 50 μm or less is higher than that of the secondary particles having a particle size in the range from 0.5 μm to 10 μm.

Further, a lithium ion secondary battery cathode of the present invention is formed including the lithium ion secondary battery cathode material.

Moreover, a lithium ion secondary battery of the present invention is provided with the lithium ion secondary battery cathode.

A method for manufacturing the lithium ion secondary battery cathode material (or called the cathode material for lithium ion secondary battery) of the present invention includes the step of: preparing primary particles of a lithium metal composite oxide having a layered structure, represented by the following composition formula (I)

[where x is a number satisfying a relationship of $-0.1 < x < 0.3$; y is a number satisfying a relationship of $0 < y < 0.1$; M1 is at least one kind of an element selected from a group of Ni, Co, Mn; and M2 is at least one kind of an element selected from Mg, Al, Ti, Zr, Mo, Nb, Fe, B], or primary particles of a lithium metal composite oxide having a different crystal structure from the lithium metal composite oxide having said layered structure.

The method further includes the steps of: wet-granulating first aggregates of secondary particles by using the primary particles, in which the secondary particles have particle size distribution in the range from 0.5 μm to 10 μm; and wet-granulating second aggregates of second particles by using the primary particles at a drying rate higher than that in the wet-granulation of the first aggregates, or using slurry with high viscosity. Herein, the secondary particles of the second aggregates have particle size distribution in the range of more than 10 μm and equal to 50 μm or less. The method further includes the step of mixing the first and second aggregates thus granulated, thereby to prepare an agglomerate of the second particles.

Herein, when the second particles forming the agglomerate are analyzed by a laser diffraction/scattering particle size measurement, a particle size (D10) corresponding to 10% in volume-based undersize cumulative particle size distribution is in the range from 0.5 μm to 10 μm, and a particle size (D90) corresponding to 90% in volume-based undersize cumulative particle size distribution is in the range of more than 10 μm and equal to 50 μm or less. Further, a mean porosity of the secondary particles having a particle size in the range of more than 10 μm and equal to 50 μm or less is higher than that of the secondary particles having a particle size in the range from 0.5 μm to 10 μm.

Effect of Invention

According to the present invention, it is possible to provide a lithium ion secondary battery cathode material having not only excellent packing ability but also excellent rate characteristics and charge-discharge cycle characteristics, a lithium ion secondary battery cathode and a lithium ion secondary battery that use said cathode material, and a method for manufacturing a lithium ion secondary battery cathode material.

EMBODIMENTS FOR CARRYING OUT INVENTION

Hereinafter, a lithium ion secondary battery cathode material in an embodiment of the present invention, a lithium ion secondary battery cathode and a lithium ion secondary battery that use the cathode material, and a method for manufacturing a lithium ion secondary battery cathode material will be described in detail. Note, same reference numbers are used for common components, and redundant explanations will be omitted.

A lithium ion secondary battery cathode material (hereinafter, referred to as a cathode material) of the present embodiment is formed including secondary particles produced via aggregation of primary particles of a lithium metal composite oxide having a layered structure (hereinafter, referred to as a layered oxide). That is, the cathode material is comprised of aggregates of the secondary particles (i.e., aggregates correspond to an agglomerate). The secondary particles included in the aggregate are formed by aggregation of the primary particles including at least primary particles of the layered oxide. The cathode material of the present embodiment forms a cathode mixture layer in the lithium ion secondary battery cathode, in combination with a conductive material and a binding agent.

The aggregate of the secondary particles is formed including large sized secondary particles each having a relatively high porosity (hereinafter, referred to as large particles) and small sized secondary particles each having a relatively low porosity (hereinafter, referred to as small particles). Note, the aggregate of secondary particles may form an agglomerate via agglomeration of the aggregates each other. Further, the aggregate of secondary particles may form a composite having an unspecific shape generated by the aggregates bonded each other via a binding agent, or a compact generated by the press-molded aggregates.

The layered oxide is represented by the following composition formula (I).

$$Li_{1+x}M1_{1-x-y}M2_yO_2 \quad (I)$$

[where x is a number satisfying a relationship of −0.1≤x≤0.3; y is a number satisfying a relationship of 0≤y≤0.1; M1 is at least one kind of an element selected from Ni, Co, Mn; and M2 is at least one kind of an element selected from Al, Ti, Zr, Mo, Nb, Fe, B]

The layered oxide represented by the composition formula (I) is a cathode active substance of a lithium metal composite material, capable of performing intercalation/deintercalation of lithium ions accompanying the electrode reaction, and mainly has an α-NaFeO₂ type layered crystal structure. In an X-ray diffraction method, diffraction peaks of the lithium metal composite material show a pattern assigned to a space group R3⁻ m. Note, in the composition formula (I), a composition ratio of oxygen is defined as 2, while it is well known that a composition ratio is slightly shifted from the stoichiometric composition depending on analytical conditions and firing conditions. Therefore, even when about 5% shift of the composition ratio of oxygen is observed with keeping the above described crystal structure, this does not mean departing from the scope of the present invention.

In the composition formula (I), x represents a number satisfying a relationship of −0.1≤x≤0.3. Thus, the composition ratio of lithium (Li) is defined in the range from 0.9 to 1.3. That is, the layered oxide is not limited to the oxide in which lithium is located only at the 3a site in the α-NaFeO2 type crystal structure. Instead, the layered oxide may be a so-called layered solid solution oxide in which the excess ratio of lithium is contained more than the stoichiometric ratio (Li(Li$_p$M$_{1-p}$)O₂ (0<p<1); e.g., represented by Li₂MO₃-LiMO₂ etc.) When a composition ratio of lithium is determined in the above range, it is possible to secure the high discharge capacity.

M1 is at least one kind of an element selected from a group of Ni, Mn, Co. Here, assume that the composition ratio of Ni is a, the composition ratio of Mn is b, and the composition ratio of Co is c. In the range satisfying the relationships of 0≤a≤1−x−y, 0≤b≤1−x−y, 0≤c≤1−x−y, and a+b+c=1−x−y, M1 may take an optional composition made from a single element or a plurality of elements. Preferably, an M1 element has a composition including at least one kind of an element selected from Ni and Mn. More preferably, the M element includes Ni, and most preferably does not include Co. Specifically, a preferable composition of the layered oxide is represented by the following composition formula (II)

$$Li_{1+x}Ni_aMn_bCo_cM2_yO_2 \quad (II)$$

[where x is a number satisfying a relationship of −0.1≤x≤0.3; a, b and c are numbers respectively satisfying relationships of 0<a≤1−x−y, 0≤b<1−x−y, 0≤c<1−x−y, a+b+c=1−x−y, a>b, a>c; y is a number satisfying a relationship of 0≤y≤0.1; M2 is at least one kind of an element selected from a group of Mg, Al, Ti, Zr, Mo, Nb, Fe, B]. Preferably, c is 0. When the layered oxide has a composition containing a high ratio of Ni, a cathode active substance with high capacity is more easily obtained at low costs.

Further, M2 is at least one kind of an element selected from a group of Mg, Al, Ti, Zr, Mo, Nb and B, and the composition ratio of the M2 element is defined in the range from 0 to 0.1. That is, in the range satisfying a relationship of 0≤y≤0.1, the M1 element may be replaced by a single element or a plurality of elements selected from a group of Mg, Al, Ti, Zr, Mo, Nb, Fe or B. When a part of the M1 element is replaced by such an element(s), the charge-discharge cycle characteristics and the rate characteristics may be improved, and further the resistance reduction may be achieved.

The secondary particles forming the cathode material are prepared so that when analyzed in laser diffraction/scattering particle size distribution measurement, a particle size (hereinafter, referred to as D10) corresponding to 10% in volume-based undersize cumulative particle size distribution is in the range from 0.5 μm to 10 μm, and simultaneously a particle size (hereinafter, referred to as D90) corresponding to 90% in volume-based undersize cumulative particle size distribution is in the range of more than 10 μm and equal to 50 μm or less, preferably from 20 μm to 50 μm.

When the secondary particles of the aggregate forming the cathode material are set to have the above particle size distribution, large particles with a large particle size are packed in high density, and simultaneously small particles with a small particle size are packed in voids formed among the large particles. This formation allows the high packing density of the cathode active substance in the electrode. Here, the laser diffraction/scattering particle size distribution measurement may be performed under the conditions in which the secondary particles are dispersed in a dispersion medium like water. The secondary particles may be measured in any shape of spheroidized particles and non-spheroidized particles.

Figure 1:
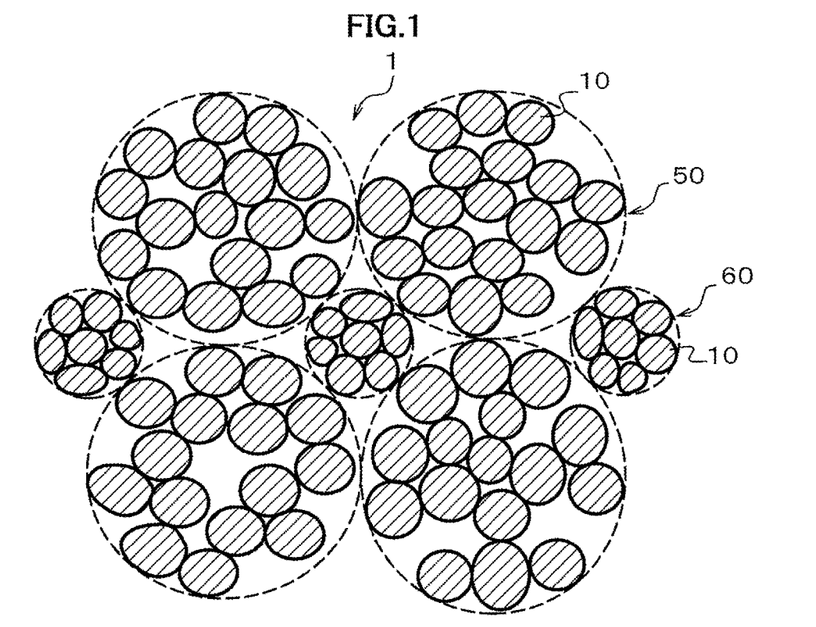
FIG. 1 is a conceptual diagram schematically showing a cross-sectional structure of a lithium ion secondary battery cathode material in an embodiment of the present invention.

FIG. 1 is a conceptual diagram schematically showing a cross-sectional structure of a lithium ion secondary battery cathode material in an embodiment of the present invention. Here, the conceptual diagram shows particle appearance and a dispersion state when the secondary particles forming the cathode material are packed with two particle sizes.

As shown in FIG. 1, a cathode material 1 is formed including large sized secondary particles (i.e., large particles) formed by aggregation of primary particles made of a layered oxide 10 alone, and small sized secondary particles (i.e., small particles) formed by aggregation of primary particles made of the layered oxide 10 alone. When such two particle-sized particles are packed, the particle size distribution of the whole secondary particles may be easily controlled to have a predetermined range of particle sizes. This formation easily realizes the high packing density.

A large particle 50 is prepared as an aggregate of the secondary particles, for example, having a single-thread type of particle size distribution in the range of more than 10 μm and equal to 50 μm or less. Here, the large particles 50 are packed closely approaching each other in high density like the closest packing. This packing enables the particle size (D90) of the whole secondary particles forming the cathode material to be set in the range of more than 10 μm and equal to 50 μm or less. Herein, D90 is a particle size corresponding to 90% in volume-based undersize cumulative particle size distribution, when analyzed by the laser diffraction/scattering particle size distribution measurement.

When the particle size distribution of the large particles 50 is in the range of more than 10 μm and equal to 50 μm or less, the coating ability and handling performance of the particles may be ensured, and further a high level of packing density of the cathode active substance may be achieved in the electrode. This eventually provides excellent advantages.

On the other hand, a small particle 60 is prepared as an aggregate of secondary particles having a single-thread type of particle size distribution in the range from 0.5 μm to 10 μm. Here, the small particles 60 are packed in the voids thus generated among the large particles 50. This packing enables the particle size (D10) of the whole secondary particles forming the cathode material to be set in the range from 0.5 μm to 10 μm. Herein, D10 is a particle size corresponding to 10% in volume-based undersize cumulative particle size distribution, when analyzed in the laser diffraction/scattering particle size distribution measurement.

When the particle size distribution of the small particles 60 is set in the range from 0.5 μm to 10 μm, a ratio of particle sizes of the small particle 60 to the large particle 50 may be set at an approximate value calculated by a two particle-sized closest packing model. Simultaneously, this may prevent deterioration of the coating ability caused by agglomeration of the small particles 60.

As shown in FIG. 1, the respective secondary particles are formed so that the large particle 60 has a higher porosity than the small particle 60. More specifically, a mean porosity of the secondary particles having a particle size in the range of more than 10 μm and equal to 50 μm or less, preferably from 20 μm to 50 μm, is made higher than that of the secondary particles having a particle size in the range from 0.5 μm to 10 μm.

Generally, in the cathode material formed only of the secondary particles having a low porosity, an electrolyte solution hardly permeates into a deep place of those particles. Hence, ion conductivity is decreased especially of the secondary particles having a small particle size, resulting in deterioration of the rate characteristics. Further, such secondary particles cannot follow the volume change caused accompanying charge-discharge operations, and therefore those secondary particles crack or separate each other. This defect generates a lot of particles incapable of exerting electrochemical ability, and therefore causes significant decrease in the charge-discharge cycle characteristics and the volume energy density.

On the other hand, in the cathode material formed only of the secondary particles having a high porosity, it is difficult to keep a high level of volume energy density of the cathode material.

In view of the above, as for the lithium ion secondary battery cathode material in the present embodiment, the packing density of the cathode active substance is made to be high by combining large sized secondary particles having a relatively high porosity and small sized secondary particles having a relatively low porosity.

Herein, main effects of the large sized particles having a high porosity secure permeation of the electrolyte solution into a deep place in the particles, and release the stress caused by volume change of the cathode active substance accompanying charge-discharge operations. Accordingly, excellent rate characteristics as well as excellent charge-discharge cycle characteristics are realized in a coexistent manner by securing the high ion conductivity and preventing occurrence of a crack caused by the volume change accompanying charge-discharge operations.

The mean porosity of the secondary particles having a particle size in the range of more than 10 μm and 50 μm or less, preferably from 20 μm to 50 μm is suitably set in the range from 5% to 70%, more preferably from 5% to 45%. The porosity of the large particle having a large particle size thus set in the range from 5% to 70% facilitates the permeation of the electrolyte solution inside the large particles. Thus, lithium ions are sufficiently supplied to a vicinity of the center core of the large particle via diffusion through a relatively long distance. This may secure the high rate characteristics.

Further, when the large particles having a large existence volume rate become capable of following the volume change accompanying charge-discharge operations, whole the secondary particles may be prevented from causing a crack, and separating each other, allowing improvement in the charge-discharge cycle characteristics. Moreover, 5% to 45% porosity of the large particles exerts the effects of releasing the volume change of the cathode active substance accompanying the charge-discharge operations, leading to increase in the volume energy density up to a higher level.

Preferably, a mean porosity of the secondary particles having a particle size in the range from 0.5 μm to 10 μm is set at 5% or less. Herein, 5% or less porosity in the small particles having a small particle size allows more increase in the packing rate of the voids formed among the large particles. The increased packing rate of the voids may secure the effects exerted by the large particles having a high porosity, thereby achieving more improvement in the volume energy density.

The porosity of the secondary particles is measured by an immersion method such as a mercury intrusion method, a gas substitution method (or gas adsorption method), or directly observed by an electron microscopy. For example, in a mercury intrusion method, a pore volume (or pore distribution) is calculated by pressuring mercury to intrude into powder of aggregates of the secondary particles, and measuring an intrusion volume of mercury while changing the pressure. Specifically, the porosity (i.e., mean porosity) is calculated by the following Equation (1).

Porosity=Pore Volume/Particle Volume×100    (Equation 1)

Here, as a particle volume of the aggregates of the secondary particles, a mean value analyzed by laser diffraction/scattering particle size distribution measurement may be used. The porosity is calculated based on distribution of pores with a diameter of 0.9 μm or less. In precise measurement, a contact angle of mercury may be set to 130° and a surface tension of mercury is set at 485 dyne/cm (i.e., $485 \times 10^{-5}$ N/cm) in the Washburn equation of the mercury intrusion method.

The lithium ion secondary battery cathode material of the present embodiment may contain multiple kinds of lithium metal composite oxides having a layered structure (i.e., layered oxides). That is, an aggregate of the secondary particles may be formed by combining multiple kinds of layered oxides having different kinds of elements and composition ratios in the range represented by the above described composition formula (I).

Specifically, the cathode material may be comprised of any one selected from: an aggregate of the secondary particles formed via aggregation of the primary particles made of multiple kinds of layered oxides; multiple kinds of aggregates of the secondary particles formed via aggregation of the primary particles made of the same kind of layered oxide; or an aggregate of both the secondary particles formed via aggregation of multiple kinds of the primary particles made of the layered oxides and the secondary particles formed via aggregation of the primary particles made of the same kind of the layered oxide.

Generally, the cathode active substances made of different compositions are different in an expansion/contraction amount generated accompanying charge-discharge operations conducted within the action potential. Hereby, the above describe large particles may be made of a layered oxide of which expansion/contraction amount is relatively large among the multiple kinds of layered oxides, while the above described small particles may be made of a layered oxide of which expansion/contraction amount is relatively small among the multiple kinds of layered oxides.

For example, the large particles may be made of a layered oxide of which nickel content is relatively large, while the small particles may be made of a layered oxide of which nickel content is relatively small. This formation makes it possible to effectively release the expansion/contraction caused accompanying charge-discharge operations through pores, and therefore, to prevent a crack and separation of the secondary particles generated accompanying charge-discharge operations, while securing the packing ability of the cathode active substance.

Alternatively, the above described large particles may be made of a layered oxide of which electric conductivity is relatively high among multiple kinds of layered oxides, while the above described small particles may be made of a layered oxide of which electric conductivity is relatively low among the multiple kinds of layered oxides. This formation makes it possible to increase the electric conductivity of the whole cathode material while effectively releasing the expansion/contraction generated accompanying charge-discharge operations through pores. Further, the respective secondary particles may include the primary particle of a layered oxide of which electric conductivity is relatively high.

The lithium ion secondary battery cathode material of the present embodiment may include primary particles of a lithium metal composite oxide having a crystal structure (hereinafter, referred to as non-layered oxide) different from a lithium metal composite oxide having a layered structure (i.e., layered oxide). In other words, the formation shown in FIG. 1 comprised of an aggregate of secondary particles 50 and 60 formed via aggregation only of primary particles of a lithium metal composite oxide having a layered structure may be replaced with the following formations.

Figure 2:
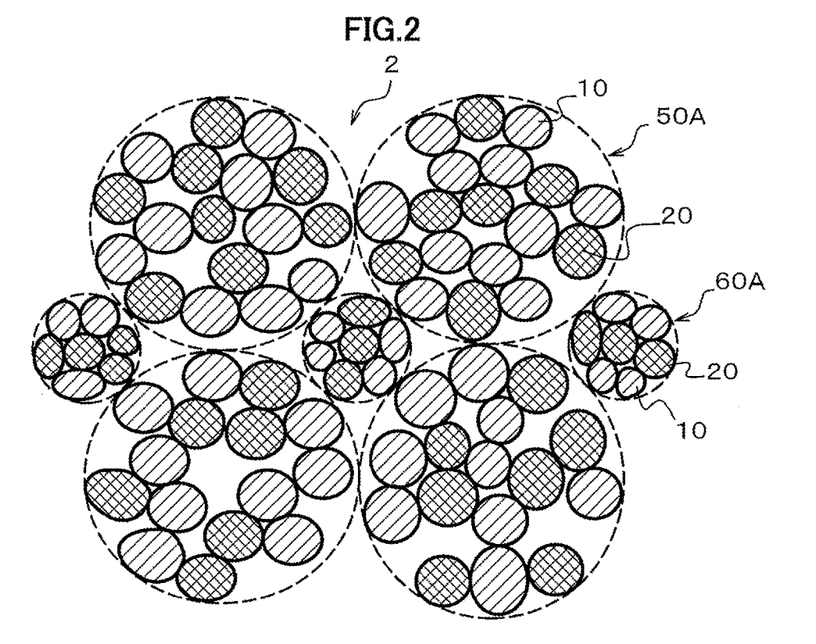
FIG. 2 is a conceptual diagram schematically showing a cross-sectional structure of a lithium ion secondary battery cathode material in another embodiment of the present invention.

Namely, such a formation may be comprised of secondary particles formed via aggregation of primary particles of a lithium metal composite oxide having a layered structure and other primary particles of a lithium metal composite oxide having a crystal structure different from the layered structure (see FIG. 2).

Figure 3:
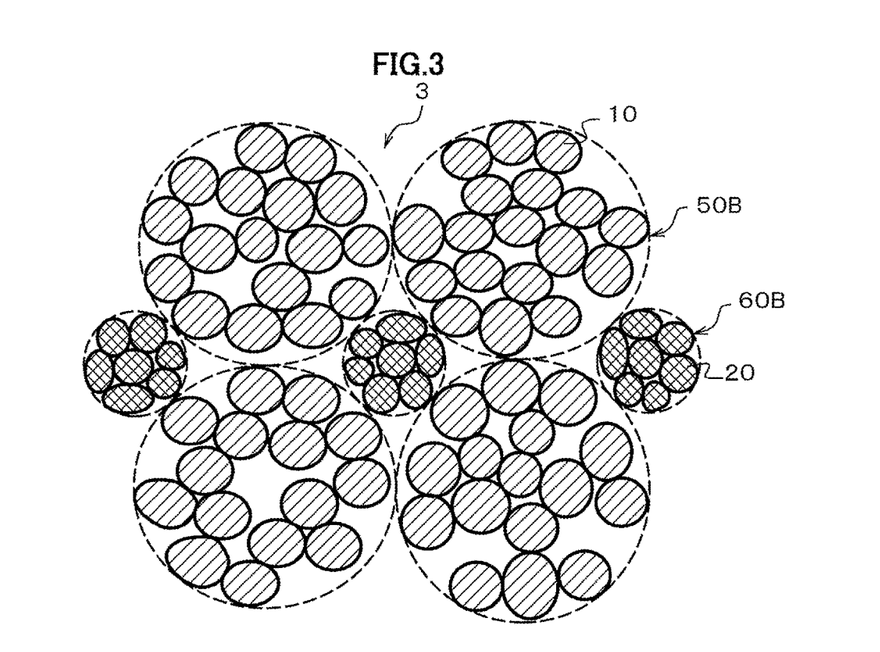
FIG. 3 is a conceptual diagram schematically showing a cross-sectional structure of a lithium ion secondary battery cathode material in another embodiment of the present invention.

Further, such a formation may be comprised of a combination of secondary particles formed via aggregation of primary particles of a lithium metal composite oxide having a layered structure and other secondary particles formed via aggregation of primary particles of a lithium metal composite oxide having a crystal structure different form the layered structure (see FIG. 3).

Figure 4:
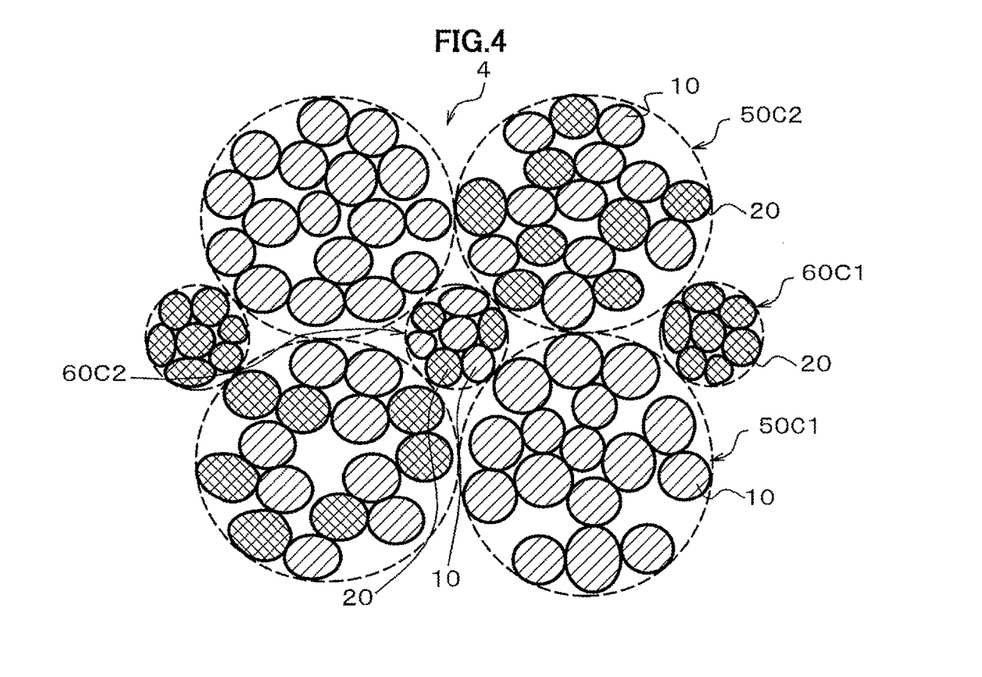
FIG. 4 is a conceptual diagram schematically showing a cross-sectional structure of a lithium ion secondary battery cathode material in another embodiment of the present invention.

Moreover, such a formation may be comprised of a combination of secondary particles formed via aggregation of primary particles of a lithium metal composite oxide having a layered structure, other secondary particles formed via aggregation of primary particles of a lithium metal composite oxide having a crystal structure different form the layered structure, and still other secondary particles formed via aggregation of primary particles of a lithium metal composite oxide having a layered structure and other primary particles of a lithium metal composite oxide having a crystal structure different from the layered structure (see FIG. 4).

Note, a relationship between the particle size and porosity of the cathode material containing the primary particles of a non-layered oxide is the same as of the cathode material containing only the primary particles of a layered oxide.

As a non-layered oxide, a lithium metal composite oxide other than a layered oxide and applicable to the cathode active substance of the lithium ion secondary battery may be used. Specifically, such a lithium metal composite oxide may be a conventionally known cathode active substance including an olivine type composite oxide such as $LiFePO_4$, $LiNiPO_4$, $LiMnPO_4$, $LiFeMnPO_4$; a spinel type composite oxide such as $LiMnO_4$, $LiMn_2O_4$, $LiNi_{0.5}Mn_{0.5}O_4$; polyanion type composite oxide such as $LiFeBO_3$, $LiNiBO_3$, $LiMnBO_3$, $Li_2FeSO_4$, $Li_2NiSO_4$, and $Li_2MnSO_4$. As a non-layered oxide, one of the above composite oxides may be used alone, or multiple kinds of the above composite oxides may be used in combination. For example, multiple kinds of the composite oxides may be used for separate secondary particles each other. Among those composite oxides, an olivine type composite oxide having small volume change accompanying charge-discharge operations is more preferable.

FIG. 2 is a conceptual diagram schematically showing a cross-sectional structure of a lithium ion secondary battery cathode material in another embodiment of the present invention.

Similarly to the cathode material 1, a lithium ion secondary battery cathode material 2 of another embodiment shown in FIG. 2 is formed by combining large sized secondary particles (i.e., large particles) having a relatively high porosity and small sized secondary particles (i.e., small particles) having a relatively low porosity. In other words, the lithium ion secondary battery cathode material 2 is comprised of primary particles of a lithium metal composite oxide having a layered structure and other secondary particles formed via aggregation of primary particles of another lithium metal composite oxide having a crystal structure different from the lithium metal composite oxide having the layered structure.

As shown in FIG. 2, an aggregate of secondary particles forming the cathode material 2 may be comprised of large sized secondary particles (i.e., large particles) 50A formed via aggregation of primary particles 10 of a layered oxide and other primary particles 20 of a non-layered oxide, and small sized secondary particles (i.e., small particles) 60A formed via aggregation of the primary particles 10 of the layered oxide and other primary particles 20 of the non-layered oxide.

In the cathode material 2 shown in FIG. 2, a porosity of the large particle 50A is set higher than that of the small particle 60A. Thus, the large particle 50A including the primary particles 10 of a layered oxide may easily follow volume change of the layered oxide (10) of which volume significantly changes accompanying charge-discharge operations. That is, in the large particle 50A having a large existence volume of the layered oxides (10), the volume change of the layered oxides (10) is effectively released by voids. This formation prevents the large particle 50A or the small particle 60A from cracking caused by the volume change, and therefor, more effectively suppresses separation of the large and small particles 50A and 60A.

On the other hand, when the large and small particles 50A and 60A are formed by combining primary particles 10 of the layered oxide and other primary particles 20 of the non-layered oxide, total of the volume change of the layered oxides (10) in the large and small particles 50A and 60A may be decreased. Further, the feature that the large and small particles 50A and 60A have the same type of particle structure provides an advantage such that a relationship of the porosities between the large and small particles 50A and 60A may be easily controlled in manufacturing procedure.

FIG. 3 is a conceptual diagram schematically showing a cross-sectional structure of a lithium ion secondary battery cathode material in still another embodiment of the present invention.

Similarly to the cathode material 1, a lithium ion secondary battery cathode material 3 of another embodiment shown in FIG. 3 is formed by combining large sized secondary particles (i.e., large particles) having a relatively high porosity and small sized secondary particles (i.e., small particles) having a relatively low porosity. Namely, the lithium ion secondary battery cathode material 3 is a mixture of secondary particles formed via aggregation of primary particles of a lithium metal composite oxide having a layered structure and other secondary particles formed via aggregation of primary particles of a lithium metal composite oxide having a crustal structure different from the lithium metal composite oxide having the layered structure.

Generally, the non-layered oxide (20) has a volume change smaller than the layered oxide (10) caused accompanying charge-discharge operations. Hereby, as shown in FIG. 3, a preferable formation includes an aggregate of the secondary particles forming the cathode material 3 thus prepared so that the aggregate working as a cathode active substance is formed by combining the secondary particles (i.e., large particles) 50B formed vial aggregation only of the primary particles 10 of the layered oxide and the secondary particles (i.e., small particles) 60B formed via aggregation only of the primary particles 20 of the non-layered oxide.

In the cathode material 3 shown in FIG. 3, a porosity of the large particle 50B is set higher than that of the small particle 60B. Thus, the large particle 50B including the primary particles 10 of a layered oxide may easily follow the volume change of the layered oxide (10) of which volume significantly changes accompanying charge-discharge operations. That is, in the large particle 50B having a large existence volume of the layered oxides (10), a volume change of the layered oxides (10) is effectively released by voids. This prevents the large particle 50B or the small particle 60B from cracking caused by the volume change, and therefor, more effectively suppresses separation of the large and small particles 50B and 60B.

On the other hand, when the small particles 60B are formed by combining primary particles 20 of the non-layered oxide, the volume change of the small particle 60B may be decreased. Further, when a cathode active substance having a small volume change accompanying charge-discharge operations is especially used for the non-layered oxide (20), this formation provides an advantage that separation of the secondary particles accompanying the charge-discharge operations can be easily suppressed.

FIG. 4 is a conceptual diagram schematically showing a cross-sectional structure of a lithium ion secondary battery cathode material in another embodiment of the present invention.

A lithium ion secondary battery cathode material 4 in another embodiment shown in FIG. 4 is formed by combining large sized secondary particles (i.e., large particles) having a relatively high porosity similarly to the cathode material 1, and small sized secondary particles (i.e., small particles) having a relatively low porosity.

As shown in FIG. 4, an aggregate of the secondary particles forming the cathode material 4 may be formed by combining the secondary particles formed via aggregation only of the primary particles 10 of the layered oxide working as a cathode active substance (i.e., large particles) 50C1, the secondary particles formed via aggregation only of the primary particles 20 of the non-layered oxide working as a cathode active substance (i.e., small particles) 60C1, and the secondary particles formed via aggregation of both the primary particles 10 of the layered oxide and the primary particles 20 of the non-layered oxide (i.e., large particle 50C2 and small particles 60C2).

In the cathode material 4 shown in FIG. 4, the porosities of the large particles 50C1 and 50C2 are set higher than those of the small particles 60C1 and 60C2. Hereby, the large particles 50C1 and 50C2 more easily follow the volume change of the layered oxide causing a significant volume change accompanying charge-discharge operations. That is, in the large particles 50C1 and 50C2 having a large existence volume of the layered oxides (10), the volume change of the layered oxides (10) is effectively released by voids. This may prevent cracks of the large particles 50C1 and 50C2 as well as the small particles 60C1 and 60C2, and therefore, more effectively suppress the separation of the large particles 50C1 and 50C2 as well as the small particles 60C1 and 60C2.

On the other hand, when the large particles 50C1 and 50C2 as well as the small particles 60C1 and 60C2 are formed so as to wrap the non-layered oxides (20), a volume ratio of the large particles 50C1 containing only the primary particles 10 of the layered oxide may be increased while decreasing a total volume change of the layered oxides (10) over the whole cathode material 4. Further, the packing density of the whole cathode active substance may be increased high.

Next, a method for manufacturing a lithium ion secondary battery cathode material of the present embodiment will be described in detail.

The lithium ion secondary battery cathode material of the present embodiment may be manufactured by the steps of: preparing multiple groups of aggregates of monodispersed secondary particles respectively having different ranges of particle sizes in advance; subsequently preparing secondary particles so that a particle size (D10) corresponding to 10% in volume-based undersize cumulative particle size distribution is set in the range from 0.5 μm to 10 μm, and simultaneously a particle size (D90) corresponding to 90% in volume-based undersize cumulative particle size distribution is set in the range of more than 10 μm and 50 μm or less, when analyzed by a laser diffraction/scattering particle size distribution measurement.

The method further includes the steps of: appropriately combining the aggregates of secondary particles thus prepared; and mixing the aggregates thus combined, thereby to prepare the lithium ion secondary battery cathode material.

In short, the manufacturing method includes the steps of preparing secondary particles and mixing the secondary particles.

In the step of preparing secondary particles, aggregates of secondary particles formed via aggregation of primary particles of a lithium metal composite oxide having a layered structure represented by the composite formula (I) are prepared in multiple groups. Note, as the aggregates of the secondary particles, it is preferable to prepare multiple groups of aggregates including aggregates of secondary particles having particle size distribution at least in the range of more than 10 μm and equal to 50 μm or less, preferably from 20 μm to 50 μm, and other aggregates of secondary particles having particle size distribution at least in the range from 0.5 μm to 10 μm. Depending on necessity, primary particles of the non-layered oxide may be formed in parallel with other primary particles of the layered oxide.

The primary particles may be formed following a general method for preparing a lithium ion secondary battery cathode active substance. As the preparation method, specifically it is possible to use any one of a solid phase method, a coreciptation method, a sol-gel method, and a hydrothermal method or the like. For example, incase of a solid phase method, primary particles may be prepared by grinding and mixing raw materials of a lithium-containing compound and an M1 element-containing compound so as to include lithium and the M1 element at a predetermined molar concentration ratio, and subsequently firing the raw material powder thus obtained.

As a raw material lithium-containing compound, for example, lithium acetate, lithium carbonate, lithium hydroxide, lithium chloride, and lithium sulfonate and the like may be used. The raw material lithium-containing compound is preferably lithium carbonate and lithium hydroxide. When those compounds are used, impurities may be removed as a gas, and thereby obtaining a product as crystal particles at a relatively low temperature.

As a raw material M1 element-containing compound, for example, an acetate, a nitrate, a carbonate, a sulfonate, an oxide, and a hydroxide and the like may be used. The raw material M1 containing-compound is preferably a carbonate, an oxide, and a hydroxide. When those compounds are used, impurities may be removed as a gas, and thereby obtaining a product as crystal particles at a relatively low temperature.

The grinding and mixing of the raw materials may be conducted in any one of a dry-grinding method and a wet-grinding method. In a step of grinding and mixing, for example, a variety of mills may be used including a ball mill, a beads mill, a planetary ball mill and a jet mill may be used.

Preferably, the resulting ground and mixed raw material compound is thermally decomposed by calcination, for example, at a temperature from 400° C. to 700° C., and subsequently is fired in the range from 700° C. to 1100° C., more preferably from 800° C. to 1000° C. In the above ranges of temperatures, crystallinity of the primary particles may be preferably improved while suppressing decomposition and volatilization of the components. Note, a treatment time of the calcination is set from 2 hr to 24 hr, preferably from 4 hr to 16 hr, and a treatment time of firing is set from 2 hr to 24 hr, preferable from 4 hr to 16 hr. The firing treatment may be repeated multiple times.

The atmosphere in the firing treatment may be any one of an inert atmosphere and an oxidizing atmosphere, however, preferably an oxidizing atmosphere such as oxygen or air. When the firing is conducted under an oxidizing atmosphere, contamination of impurities due to incomplete thermal decomposition of the raw materials may be prevented, allowing improvement in the crystallinity of the primary particles. Further, when the layered oxide contains Ni in a high content ratio, the atmosphere in the calcination may be any one of an inert atmosphere and an oxidizing atmosphere, while the atmosphere in the firing treatment is preferably an oxidizing atmosphere, especially an atmosphere of which oxygen concentration is higher than the air. Note, the primary particles thus fired may be gradually cooled in the air, or rapidly cooled by liquid nitrogen or the like.

A mean particle size of the primary particles of the layered oxide is set preferably in the range from 0.1 μm to 2 μm. When the mean particle size of the primary particles is set at 2 μm or less, the packing ability of the layered oxide is improved, thereby achieving the high energy density. Further, when the mean particle size of the primary particles is set at 0.1 μm or more, the handling performance of the primary particles is not remarkably damaged, allowing prevention of excessive aggregation of the primary particles.

Here, in the primary particles of the layered oxide, an M2 element may be almost uniformly placed in crystals of the primary particles, or coated on surfaces of the primary particles. The primary particles in which the M2 element almost uniformly placed in the crystals thereof may be prepared by mixing a raw material M2 element-containing compound with a lithium-containing compound or an M1 element-containing compound in advance, and eventually subjected to the primary particle formation. Further, the primary particles of which surfaces are coated may be prepared by a known surface treatment method such as a mechanochemical method and a sol-gel method.

As a method for granulating the secondary particles, any one of dry-granulation or wet-granulation may be applicable, including an appropriate granulation method such as rolling granulation, fluid bed granulation, compression granulation, and spray granulation or the like. Depending on the aggregation conditions of the raw material powder and the primary particles to be fired, the raw material powder prior to be fired may be subjected to granulation, or the fired body produced after being fired may be subjected to granulation.

Here, a particularly preferable granulation method is wet-granulation. For example, when the raw material powder is mixed/ground by wet-granulation, addition of a binding agent to the raw material powder dispersed in a dispersion medium improves the aggregation ability, thereby providing an advantage that the fired body is easily formed of secondary particles. Further, when spray-granulation using a granulator like a spray dryer is applied, the secondary particle with several µm to tens of µm each having a different porosity may be easily granulated.

A porosity and a particle size of the secondary particle may be controlled by adjusting various conditions, for example, a concentration of slurry made via dispersion of raw powder or fired bodies, a slurry viscosity, a supplied amount of slurry, a dispersion degree (or aggregation degree) in slurry in wet-granulation; a compression load in dry-granulation; or a spray temperature, a spray pressure, a blasting rate in splay-granulation (or spray dry) to be performed after wet-granulation.

For example, the secondary particles having a high porosity may be prepared by firing agreeable raw material powder having high viscosity in slurry and a low dispersion degree in slurry after subjected to splay dry, or by firing the agreeable raw material powder after subjected to spray dry in which the spray pressure and spray temperature are raised to increase the drying rate. On the other hand, the secondary particles having a low porosity may be prepared by firing non-agreeable raw material powder having a low dispersion degree in slurry, or by firing the non-agreeable raw material powder after subjected to spray dry in which the spray pressure and spray temperature are lowered to lower the drying rate.

In the step of mixing secondary particles, a lithium ion secondary battery cathode material is prepared so that a particle size (D10) corresponding to 10% in volume-based undersize cumulative particle size distribution is in the range from 0.5 µm to 10 µm, and simultaneously a particle size (D90) corresponding to 90% in volume-based undersize cumulative particle size distribution is in the range of more than 10 µm and equal to 50 µm or less, when analyzed by the laser diffraction/scattering particle size distribution measurement.

Herein, depending on the particle size distribution of the respective aggregates, multiple groups of the aggregates formed of the secondary particles may be mixed at an appropriate volume ratio. However, in view of optimized packing density of the cathode active substance, preferably two groups of aggregates formed of large and small particles whose particle size distribution follows normal distribution may be mixed at a predetermined volume ratio. The volume ratio of the large particles against the small particles to be mixed may depend on a particle size ratio of the large particles against the small particles. However, preferably the volume ratio is set in the range of 3.5:1-6.0:1, more preferably 4.0:1-5.0:1.

Next, a lithium ion secondary battery cathode of the present embodiment will be described in detail.

A lithium ion secondary battery cathode of the present embodiment is provided with the above described lithium ion secondary battery cathode material, a conductive material, a cathode mixture layer including a binding agent, and a cathode current collector in which the cathode mixture layer is formed on a main surface thereof.

As a conductive material, any conductive material used in a typical lithium ion secondary battery cathode may be used. More specifically, such a conductive material is, for example, carbon particles such as graphite powder, acetylene black, furnace black, thermal black, channel black, and carbon fibers such as pitch-based carbon fibers and a polyacrylonitrile (PAN)-based carbon fibers or the like. The conductive material may be used in the amount of, for example, from 3 mass % to 10 mass % against the mass of the whole cathode mixture material. Note, the conductive material may be mixed with secondary particles, or mixed with primary particles when granulating secondary particles.

As a binding agent, any binding agent used in a typical lithium ion secondary battery cathode may be used. More specifically, such a biding agent is, for example, polyvinylidene fluoride (PVDF), polytetrafluoroethylene, styrene-butadiene rubber, carboxymethyl-cellulose, polyacrylonitrile, and modified polyacrylonitrile. The binding agent may be used in the amount of from 2 mass % to 10 mass % against the mass of the whole cathode mixture material.

As a cathode current collector, foil of aluminum or aluminum alloy, an expanded metal, or a punching metal or the like may be used. Such foil may have a thickness of 8 µm to 20 µm.

Here, the lithium ion secondary battery cathode of the present embodiment may be manufactured via using the above described lithium ion secondary battery cathode active substance, following a method for manufacturing a typical lithium ion secondary battery cathode. For example, the lithium ion secondary battery cathode may be manufactured in the steps of preparing a cathode mixture material, coating with a cathode mixture material, and molding a resulting coated product.

In the step of preparing a cathode mixture material, a cathode material, a conductive material, and a binding agent are mixed in a medium, thereby preparing a slurry type of cathode mixture material. Depending on a type of the binder agent, such a medium may be, for example, N-methylpyrrolidone, water, N,N-dimethylformamide, N,N-dimethyl-acetamide, methanol, ethanol, propanol, isopropanol, ethylene glycol, diethylene glycol, glycerin, dimethylsulfoxide, and tetrahydrofuran or the like. Further, when mixing the materials, for example, a planetary mixer, a disperser mixer, and a rotation-revolution mixer or the like may be used.

In the step of coating with a cathode mixture material, a slurry type of cathode mixture material thus prepared is coated on a main surface of the cathode current collector, and subsequently the cathode mixture layer is formed by drying. For coating with the cathode mixture material, for example, a bar coater, a doctor blade, a roll transcriber or the like may be used.

In the step of molding a resulting coated product, the step includes the processes of press-molding the cathode mixture material layer thus dried, cutting the resulting molded product and the cathode current collector together depending on necessity, thereby to produce a lithium ion secondary battery cathode in a desirable shape. The cathode mixture material layer formed on the cathode current collector may have a thickness of, for example, about 50 µm to 300 µm. Further, the pressure and compression load in the press-molding process may be appropriately adjusted depending on the desirable electrode density. However, preferably the pressure and compression load may be set at a certain degree so that the porosity of the respective secondary particles is maintained.

Next, a lithium ion secondary battery of the present embodiment will be described in detail.

Figure 5:
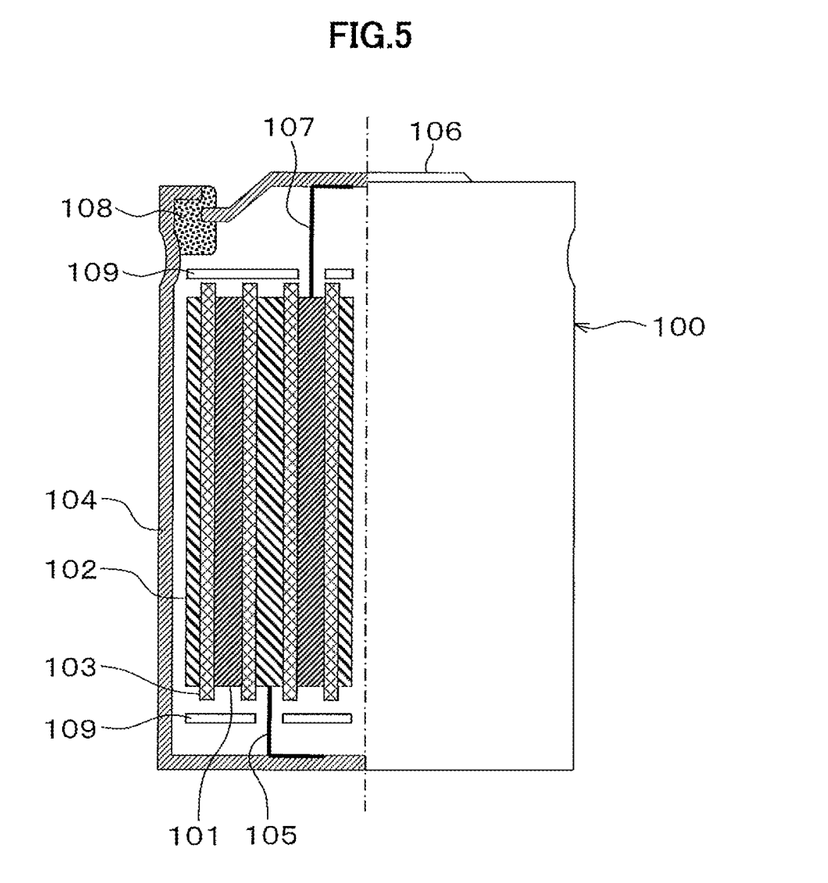
FIG. 5 is a cross-sectional schematic diagram showing a lithium ion secondary battery in an embodiment of the present invention.

FIG. 5 is a cross-sectional diagram schematically showing an example of a lithium ion secondary battery of the present embodiment.

A lithium ion secondary battery 100 of the present embodiment is mainly provided with the above described cathode (i.e., lithium ion secondary battery cathode) 101, and a anode 102, a separator 103, and a non-aqueous electrolyte solution (not shown). The lithium ion secondary battery 100 is a cylindrical shaped lithium ion secondary battery. The non-aqueous electrolyte solution is stored in a battery can 104 having a cylindrical shape with a bottom. Note, the lithium ion secondary battery 100 may have a shape of triangle, button, and laminated sheet.

In the lithium ion secondary battery 100, a cathode 101 in which a cathode mixture material layer is formed on a main surface of a cathode current collector, and a anode 102 in which a anode mixture material layer is formed on a main surface of an anode current collector are wound with a separator 103 that is interposed between the cathode 101 and the anode 102, thereby to form laminated battery groups.

Further, the cathode 101 is electrically connected to a sealing lid 106 via a cathode lead piece 107. The anode 102 is electrically connected to a battery can 104 via an anode lead piece 105.

The cathode lead piece 107 and the anode lead piece 105 are respectively current extraction members made of the same material as of the anode current collector, and respectively welded to the cathode current collector and the anode current collector. Further, insulating plates are respectively disposed between the cathode lead piece 107 and anode 102, and the anode lead piece 105 and the cathode 101, so as to insulate therebetween. The battery can 104 houses groups of the electrodes as well as the non-aqueous electrolyte solution, and sealed by the sealing lid through a sealing material 108.

The anode 102 is provided with an anode active substance, and an anode current collector electrically connected to the anode active substance. Note, in the anode 102, a binding agent and a conductive material similar to those used in the lithium ion secondary battery cathode may be used. Such a binding agent may be used, for example, at about 5 mass % against the mass of the anode active substance.

As an anode active substance, any anode active substance used in a typical lithium ion secondary battery anode may be used. More specifically, for example, at least one material selected from a carbon material, a metal material, a metal oxide material may be used. As a carbon material, for example, graphite such as natural graphite, artificial graphite; carbide such as coke, pitch, amorphous carbon, carbon fiber or the like may be used.

Further, as a metal material, for example, a metal such as lithium, silicon, tin, aluminum, indium, gallium, magnesium, and alloys thereof may be used. As a metal oxide material, a metal oxide containing tin, silicon or the like may be used.

As an anode current collector, foil of copper or nickel, expanded metal, punching metal or the like may be used. The foil may have a thickness in the range of 5 μm to 20 μm.

A lithium ion secondary battery anode may be prepared similarly to the lithium ion secondary battery cathode. The preparation method includes the steps of: mixing the anode active substance and the binding agent to prepare an anode mixture material; coating a main surface of the anode current collector with the anode mixture material, subsequently drying a coated product so as to from an anode mixture material layer; press-molding the anode mixture material layer; and cut the molded product together with the anode current collector depending on necessity. The anode mixture material layer formed on the anode current collector may have a thickness of, for example, about 20 μm to 150 μm.

As a separator 104, polyolefin based resin such as polyethylene, polypropylene, polyethylene-polypropylene copolymer; microporous film or non-woven fiber such as polyamide resin and aramid resin may be used.

As a non-aqueous electrolyte solution, a solution made by dissolving a lithium salt such as $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4$ (SO3) 2, $LiN(CF_3SO_2)_2$, $LiC(CF_3SO_2)_2$ in an non-aqueous solvent may be used. The non-aqueous electrolyte solution preferably has a concentration of a lithium salt in the range of 0.7M to 1.5M.

As a non-aqueous solvent, diethyl carbonate, dimethyl carbonate, ethylene carbonate, propylene carbonate, vinylene carbonate, ethyl methyl carbonate, methyl propyl carbonate, methyl acetate, dimethoxyethane may be used. Further, a variety of additives may be added into the non-aqueous electrolyte solution in order to suppress oxidative decomposition and reductive decomposition of the electrolyte solution, precipitation of the metal element, and thereby to improve the ionic conductivity and incombustibility.

As an additive, for example, 1,3-propanesultone and 1,4-butanesultone which suppress decomposition of the electrolyte solution, insoluble poly(adipic anhydride) and hexahydrophthalic anhydride which improve the preservability of the electrolyte solution, and fluorine substituted alkylboron that improves incombustibility or the like may be used.

A lithium ion secondary battery of the present embodiment is suitable for a power supply for portable electronics such as a smartphone and a tablet terminal; a power supply for electric home appliances; a stationary power supply for power storage facility, an uninterruptible power supply system and a power leveling device; and a driving power supply for a ship, a train, a hybrid vehicle and an electric vehicle.

Here, compositions, particle sizes and porosities of the secondary particles included in the cathode of the lithium ion secondary battery may be checked by disassembling the lithium ion secondary battery in a globe box or the like; detaching the cathode therefrom; collecting compositions forming the cathode mixture material layer, and analyzing the compositions by an analytical apparatus. For example, the compositions of the cathode mixture material layer thus collected are heated at about 300° C. to 400° C. under an inert atmosphere, thereby gasifying and removing only a carbon based conductive material and a binder agent possibly contained as the compositions. Alternatively, a binder agent is dissolved and removed by adding an appropriate organic solvent to the compositions. Then, the particle size distribution and porosity of the secondary particles may be checked by observing the residual compositions via a scanning electron microscope and a transmission electron microscope.

When the secondary particles are aggregated or bonded each other thereby forming a higher-order structure, the porosity may be checked, for example, by locally observing the secondary particles to estimate an area ratio between the secondary particles and the voids, or a volume ratio between a volume of the secondary particles and a volume of the voids. Herein, the volumes of the secondary particles and the voids may be calculated by converting those real volumes to the approximate volumes composed of a spherical volume or a cylindrical volume or the like. Further, in parallel with check of the particle size distribution, aggregates of the secondary particles are roughly ground, and the ground aggregates are classified. Then, the classified aggregates of the secondary particles having particle sizes corresponding to the large particle or small particle in the particle size distribution thus checked are subjected to pore distribution measurement. This procedure allows check of the porosity.

EXAMPLE

Hereinafter, the present invention will be specifically explained referring to Examples. However, the technical scope of the present invention is not limited to these Examples.

In Examples 1-11, lithium secondary battery cathode materials formed by combining secondary particles having a relatively high porosity (i.e. large particle) and secondary particles having a relatively low porosity (i.e. small particle) were prepared. Then, lithium ion secondary batteries respectively including the above cathode materials were produced, and subsequently rate characteristics and charge-discharge characteristics thereof were evaluated.

Further, in Comparative Examples 1-5, cathode materials each having a magnitude relation of the porosities between a large particle and a small particle reversed to a magnitude relation of the porosities in Examples were produced, and lithium ion secondary batteries respectively including the above cathode were simultaneously evaluated.

The aggregates of the secondary particles formed via aggregation of the primary particles of a layered oxide such as $LiNi_{0.8}Co_{0.1}Mn_{0.1}O_2$ were prepared in multiple groups using the following procedure. It should be noted that a lithium ratio after firing became lower than a blending ratio because a lithium source was vaporized at the firing process at about 700° C. Thus, the blending ratio was adjusted at the stage of mixing raw materials of lithium carbonate, nickel carbonate, cobalt carbonate and manganese carbonate so that the raw materials were weighed in the molar ratio of Li:Ni:Co:Mn to be 1.03:0.80:0.10:0.10, respectively.

Those weighed raw materials were ground and mixed in wet-grinding using water to which a small amount of granulated particles were added. After that, the resulting mixture was spray dried by a spray-dryer, thereby to produce aggregated powder of the raw materials. Then, the powder of the raw materials thus obtained was fed into a high-purity aluminum vessel, and calcined under an oxygen stream at 650° C. for 12 hr. Next, the calcined body thus obtained was air cooled and cracked. The cracked product was again fed into a high-purity aluminum vessel, and fired under an oxygen stream at 850° C. for 8 hr. After that, the aggregates of the secondary particle thus obtained were air cooled, cracked, and subsequently classified.

Here, particle sizes and porosities of the secondary particles in the respective groups were adjusted by appropriately modifying the conditions of wet-grinding and spray-drying for the power of the raw materials. Note, a particle size largely depends on the spray conditions. Generally, a particle size varies associated with a scale of a spray-dry apparatus. However, when a spray pressure is high and a supplied amount of slurry is large, a particle size becomes large. On the contrary, when a spray pressure is low and a supplied amount of slurry is small, a particle size becomes small.

Further, a porosity is greatly influenced by viscosity and concentration of slurry. Therefore, slurry having high viscosity provides a high porosity, while slurry having low viscosity provides a low porosity. In the present Example, a supplied amount of slurry was set at about 2 kg/hr in the spray-drying, and a particle size and a porosity were controlled by adjusting the above described parameters. Hereby, the viscosity of slurry was set in the range of 5 mPa·S-30 mPa·S at 100 rpm; the concentration of slurry was set in the range of 10%-70%; and the spray pressure was set in the range of 0.05 Mpa-0.5 Mpa.

The cathode active substance obtained in firing had a composition ratio of Li:Ni:Mn=1.00:0.80:0.10:0.10. The obtained cathode active substance was analyzed in the crystal structure thereof. The analysis was performed by an X-ray diffraction device [RINT III] (Rigaku Co.) using CuKα rays. As a result, peaks assigned to the space group R3-m were confirmed demonstrating that the cathode active substance had a layered structure.

The particle size distribution of the aggregates of the respective secondary particles thus prepared was analyzed by a laser diffraction/scattering particle size distribution measurement device [LA-920] (HORIBA, Ltd.). Here, the ultrasonic wave was applied for 5 min.

Further, the porosity of the respective secondary particles thus prepared was analyzed by a mercury press-in method using a thin hole distribution measurement device [AutoPore IV 9520] (Shimadzu Co.). Specifically, each of powders (0.3 g) of the respective secondary particles prepared via modifying the conditions was fed into a powder cell (5 cc), and the measurement was started at 20 kPa of the initial pressure. A volume of pores was measured under the conditions of the pore diameter in the range of 3 nm to 60 μm. Here, a contact angle and a surface tension of mercury were assumed at 130° and 485 dyne/cm (i.e., $485 \times 10^{-5}$ N/cm), and a porosity was calculated by the above described equation (1) assuming that voids present inside the secondary particles have a pore diameter in the range of 0.9 μm or less.

In Examples 1-11, the respective secondary particles thus measured of the particle size distribution and porosity were prepared by mixing 2 type particles of large particles and small particles so that those secondary particles were formed by combining large sized secondary particles (i.e., large particles) having a relatively high porosity and small sized secondary particles (i.e., small particles) having a relatively low porosity. On the contrary, in Comparative Examples 1-5, the respective secondary particles were prepared by mixing 2 type particles of large particles and small particles so that those secondary particles were formed by combining large sized secondary particles (i.e., large particles) having a relatively low porosity and small sized secondary particles (i.e., small particles) having a relatively high porosity.

Note, Table 1 shows volume ratios and porosities of the large and small particles thus mixed, and particle size distribution of the cathode thus obtained in Examples 1-11 as well as particle size distribution of the cathode thus obtained in Comparative Examples 1-5.

Next, lithium ion secondary batteries were manufactured by the following procedure using the lithium ion secondary battery cathode materials thus obtained. Herein, those lithium ion secondary batteries were cylindrical type 18650 batteries having 18 mm diameter×650 mm height.

As for the cathode, a cathode material of 90 parts by mass, a conductive material of 6 parts by mass and a binding agent of 4 parts by mass were mixed in a solvent. Then, the mixture was stirred for 3 hr by a planetary mixer, thereby to prepare the cathode mixture material. Herein, powder of carbon particles was used for the conductive material, poly vinylidene fluoride was used for the binding agent, and N-methylpyrrolidone was used for the solvent. Then, both surface sides of a cathode current collector made of aluminum foil with a thickness of 20 μm by a roll transferring device were coated with the resulting mixture material. The coated collector was pressed to have the electrode density of about 3.0 g/cm³, and subsequently cut to produce a cathode. Table 1 shows electrode densities of the cathodes in Examples 1-11 thus obtained as well as electrode densities of the cathodes in Comparative Examples 1-5 thus obtained.

As for the anode, an anode active substance of 95 parts by mass and a binding agent of 5 parts by mass were mixed in a solvent. Then, the mixture was stirred for 30 min by a slurry mixer, thereby to produce the anode mixture material. Herein, graphite was used for the anode active substance, poly vinylidene fluoride was used for the binding agent, and N-methylpyrrolidone was used for the solvent. Then, the anode mixture material thus obtained was applied to both surface sides of an anode current collector made of copper foil with a thickness of 10 μm by a roll transferring device. The coated collector was pressed by a roll press, and subsequently cut to produce an anode.

The cathode and anode thus obtained were respectively connected to a cathode lead piece and an anode lead piece via ultrasonic welding. Then, a porous polyethylene film was placed between the cathode and the anode, the resulting electrodes were cylindrically wound and housed in a battery can. After that, the cathode lead piece and the anode lead piece were respectively connected to the battery can and sealing lid, and subsequently the battery can was sealed with the sealing lid via laser welding. Then, a non-aqueous electrolyte solution was poured inside the battery can via a liquid injection inlet, so as to manufacture a lithium ion secondary battery. Herein, the non-aqueous electrolyte solution was prepared by dissolving $LiPF_6$ at the concentration of 1.0 mol/L in a mixed solvent of ethylene carbonate and dimethyl carbonate in the volume ratio of 1:2.

Next, lithium ion secondary batteries thus manufactured by respectively using the cathode materials in Examples 1-11 and the cathode materials in Comparative Examples 1-5 were subjected to a charge-discharge test, and evaluated in the rate characteristics and charge-discharge cycle characteristics. Note, the charge-discharge test was performed at the environmental temperature of 25° C.

A discharge capacity in each rate was measured by the following procedure. First, for a lithium ion secondary battery, constant current/low voltage charging was performed with a current equivalent to 0.2 C up to the upper limit voltage of 4.5V. After 30 min suspension, constant current discharging was performed down to the lower limit voltage of 3.0V. Then, the above charging-discharging was determined as one cycle, totally two cycles of charging-discharging were repeated. Herein, a value of the discharge capacity density per the cathode material thus obtained after the two cycles was determined as a discharge capacity (Ah/kg) at 0.2 C.

Next, after a discharge capacity with a current equivalent to 0.2 C was measured, constant current/low voltage discharging was performed with a current equivalent to 0.2 C up to the upper limit voltage of 4.5V, and suspended for 10 min. Subsequently, discharging was performed with a constant current of about 5.00 up to the lower limit voltage of 3.0V. Herein, a value of the discharge capacity density per the cathode material thus obtained at that time was determined to be a discharge capacity (Ah/kg) at 5.00. Then, a ratio of the discharge capacity thus measured at 5.00 against the discharge capacity at 0.2 C was calculated as a rate capacity maintenance ratio (%). Table 1 shows the results.

A capacity maintenance ratio in the charge-discharge cycle was measured by the following procedure. After a discharge capacity at 5.0 C was measured, constant current/low voltage charging was performed with a current equivalent to 0.2 C up to the upper voltage of 4.5V. After 30 min suspension, discharging was performed with a current equivalent to 0.2 C down to the lower limit voltage of 3.0V. A value of the discharge capacity measured at that time was determined to be a discharge capacity prior to conducting a charge-discharged cycle. Then, constant current/low voltage charging was performed with a current equivalent to 1.00 up to the upper voltage of 4.5V. After 10 min suspension, discharging was performed with a current equivalent to 1.00 down to the lower limit voltage of 3.0V.

Next, totally 99 cycles of charging-discharging were repeated with the above charging-discharging set as one cycle. After that, constant current/low voltage charging was performed with a current equivalent to 0.2 C up to the upper voltage of 4.5V. After 30 min suspension, discharging was performed with a current equivalent to 0.2 C down to the lower limit voltage of 3.0V. Then, a ratio of the discharge capacity thus measured at the 100th cycle against the discharge capacity prior to conducing the charge-discharge cycle was calculated as a capacity maintenance ratio (%). Table 1 shows the results.

TABLE 1

| | Particle Size (μm) | | Porosity (%) | | Ratio of Particle Volume | Electrode Density | Charge Capacity (Ah/kg) | | Rate Capacity Maintenance | Cycle Capacity Maintenance |
| | D10 | D90 | Small Particle | Large Particle | (Large/Small) | (g/cm³) | 0.2 C | 5.0 C | Ratio (%) | Ratio (%) |
| --- | --- | --- | --- | --- | --- | --- | --- | --- | --- | --- |
| Example 1 | 9 | 40 | 5 | 42 | 4.2:1 | 3.1 | 196.2 | 148.0 | 75.4 | 88.9 |
| Example 2 | 10 | 32 | 5 | 38 | 5.0:1 | 3.0 | 197.2 | 145.7 | 73.9 | 88.4 |
| Example 3 | 8 | 25 | 4 | 30 | 4.3:1 | 2.9 | 193.7 | 147.1 | 75.9 | 88.6 |
| Example 4 | 7 | 31 | 5 | 35 | 4.9:1 | 2.9 | 193.9 | 148.9 | 76.8 | 90.1 |
| Example 5 | 7 | 41 | 3 | 33 | 4.9:1 | 3.0 | 193.7 | 150.3 | 77.6 | 91.2 |
| Example 6 | 8 | 43 | 2 | 60 | 5.3:1 | 3.0 | 195.0 | 149.1 | 76.5 | 88.6 |
| Example 7 | 6 | 32 | 3 | 55 | 3.8:1 | 3.0 | 193.4 | 147.6 | 76.3 | 90.1 |
| Example 8 | 3 | 29 | 3 | 65 | 3.7:1 | 2.9 | 197.0 | 141.7 | 71.9 | 92.0 |
| Example 9 | 2 | 27 | 5 | 68 | 5.1:1 | 2.8 | 196.2 | 142.4 | 72.6 | 88.6 |
| Example 10 | 7 | 43 | 2 | 55 | 5.4:4 | 3.2 | 192.8 | 150.2 | 77.9 | 90.1 |
| Example 11 | 9 | 48 | 1 | 51 | 5.6:1 | 3.0 | 195.4 | 148.1 | 75.8 | 92.1 |
| Comparative Example 1 | 10 | 20 | 33 | 5 | 1:1 | 3.0 | 193.1 | 132.2 | 68.5 | 83.4 |
| Comparative Example 2 | 5 | 30 | 23 | 3 | 4.3:1 | 2.9 | 193.9 | 131.9 | 68.0 | 85.7 |
| Comparative Example 3 | 5 | 35 | 19 | 1 | 4.9:1 | 2.5 | 194.3 | 144.4 | 74.3 | 88.6 |

TABLE 1-continued

|  | Particle Size (μm) | | Porosity (%) | | Ratio of Particle Volume (Large/Small) | Electrode Density (g/cm³) | Charge Capacity (Ah/kg) | | Rate Capacity Maintenance Ratio (%) | Cycle Capacity Maintenance Ratio (%) |
|---|---|---|---|---|---|---|---|---|---|---|
|  | D10 | D90 | Small Particle | Large Particle | | | 0.2 C | 5.0 C | | |
| Comparative Example 4 | 8 | 50 | 60 | 4 | 3.8:1 | 3.2 | 194.5 | 130.8 | 67.2 | 82.1 |
| Comparative Example 5 | 6 | 30 | 50 | 2 | 4.3:1 | 3.0 | 199.2 | 132.9 | 66.7 | 85.7 |

As shown in Table 1, the lithium ion secondary batteries in Examples 1-11 have a particle size (D10) corresponding to 10% in the volume-based cumulative particle size distribution being in the range from 0.5 μm to 10 μm, and simultaneously a particle size (D90) corresponding to 90% in the volume-based cumulative particle size distribution being in the range of more than 10 μm and equal to 50 μm or less.

Further, a mean porosity of the secondary particles having a particle size being in the range of more than 10 μm and equal to 50 μm or less is higher than that of the secondary particles having a particle size being in the range from 0.5 μm to 10 μm. Moreover, a mean porosity of the secondary particles having a particle size being in the range of more than 10 μm and equal to 50 μm or less is more than 5% and equal to 70% or less, and a mean porosity of the secondary particles having a particle size being in the range from 0.5 μm to 10 μm is equal to 5% or less.

On the contrary, the lithium ion secondary batteries in Comparative Examples 1-5 have a particle size (D10) corresponding to 10% in the volume-based cumulative particle size distribution being in the range from 0.5 μm to 10 μm, and simultaneously a particle size (D90) corresponding to 90% in the volume-based cumulative 90% particle size distribution being in the range of more than 10 μm and equal to 50 μm or less.

However, a mean porosity of the secondary particles having a particle size being in the range of more than 10 μm and equal to 50 μm or less is lower than that of the secondary particles having a particle size being in the range from 0.5 μm to 10 μm.

The lithium ion secondary batteries in Comparative Examples 1-5 have a rate capacity maintenance ratio in the latter half of 60%, and a cycle capacity maintenance ratio equal to or less than 86%~87%. On the contrary, the lithium ion secondary batteries in Examples 1-11 have a rate capacity maintenance ratio generally more than about 72% as well as a cycle capacity maintenance ratio in around 75%~76%. Those results demonstrate achievement of the excellent rate characteristics.

Accordingly, the feature that the mean porosity of the secondary particles having a particle size in the range of more than 10 μm and equal to 50 μm or less is higher than that of the secondary particles having a particle size in the range from 0.5 μm to 10 μm enables improvement in the rate capacity maintenance ratio as well as the cycle capacity maintenance ratio. Further, the lithium ion secondary batteries in Examples 1-11 realize the cycle capacity maintenance ratio in the range of more than 88% to around 90%, which demonstrates achievement of the excellent charge-discharge characteristics.

EXPLANATION OF REFERENCE NUMBERS

1 Lithium ion secondary battery cathode material
10 Layered oxide
50 Large particle (secondary particle)
60 Small particle (secondary particle)
100 Lithium ion secondary battery
101 Cathode (Lithium ion secondary battery cathode)
102 Anode
103 Separator
104 Battery can
105 Anode lead piece
106 Sealing lid
107 Cathode lead piece
108 Sealing material
109 Insulating plate

The invention claimed is:

1. A cathode material for lithium ion secondary battery, made from an agglomerate including secondary particles formed via aggregation of primary particles of a lithium metal composite oxide having a layered structure, represented by the following composition formula (I)

$$Li_{1+x}M1_{1-x-y}M2_yO_2 \qquad (I)$$

where x is a number satisfying a relationship of $-0.1 \leq x \leq 0.3$; y is a number satisfying a relationship of $0 \leq y \leq 0.1$; M1 is at least one kind of an element selected from a group of Ni, Co, Mn; and M2 is at least one kind of an element selected from a group of Mg, Al, Ti, Zr, Mo, Nb, Fe, B, wherein the secondary particles forming the agglomerate have a particle size D10, which corresponds to 10% in volume-based cumulative particle size distribution encompassed within the range from 0.5 μm to 10 μm, and simultaneously a particle size D90, which corresponds to 90% in volume-based cumulative particle size distribution encompassed within the range of more than 10 μm and equal to 50 μm or less, when analyzed by laser diffraction/scattering particle size distribution measurement; and a mean porosity of the secondary particles having the particle size D90 is higher than a mean porosity of the secondary particles having the particle size D10.

2. The cathode material for lithium ion secondary battery described in claim 1, wherein the mean porosity of the secondary particles having the particle size D90 is in the range from 5% to 70%; and
the mean porosity of the secondary particles having the particle size D10 is in the range equal to 5% or less.

3. The cathode material for lithium ion secondary battery described in claim 1, further comprising primary particles of a lithium metal composite oxide having a different crystal structure from the lithium metal composite oxide having the layered structure.

4. The cathode material for lithium ion secondary battery described in claim 3, comprised of any one selected from:
the secondary particles formed via aggregation of the primary particles of the lithium metal composite oxide having the layered structure and the primary particles of the lithium metal composite oxide having the different crystal structure;

a combination of the secondary particles formed via aggregation of the primary particles of the lithium metal composite oxide having the layered structure and the secondary particles formed via aggregation of the primary particles of the lithium metal composite oxide having the different crystal structure; or a combination of the secondary particles formed via aggregation of the primary particles of the lithium metal composite oxide having the layered structure;

the secondary particles formed via aggregation of the primary particles of the lithium metal composite oxide having the different crystal structure; and the secondary particles formed via aggregation of the primary particles of the lithium metal composite oxide having the layered structure and the primary particles of the lithium metal composite oxide having the different crystal structure.

5. A lithium ion secondary battery cathode comprising a cathode material for lithium ion secondary battery described in claim 1.

6. A lithium ion secondary battery provided with a lithium ion secondary battery cathode described in claim 5.

7. A method for manufacturing a cathode material for lithium ion secondary battery, comprising the steps of:

preparing primary particles of a lithium metal composite oxide having a layered structure, and further primary particles of a lithium metal composite oxide having a different crystal structure from the lithium metal composite oxide having the layered structure, wherein each of the lithium metal composite oxides is represented by the following formula (I)

$$Li_{1+x}M1_{1-x-y}M2_yO_2 \quad (I)$$

where x is a number satisfying a relationship of $-0.1 \leq x \leq 0.3$; y is a number satisfying a relationship of $0 \leq y \leq 0.1$; M1 is at least one kind of an element selected from a group of Ni, Co and Mn; and M2 is at least one kind of an element selected from a group of Mg, Al, Ti, Zr, Mo, Nb, Fe and B;

wet-granulating a first aggregate of secondary particles each having particle size distribution encompassed within the range from 0.5 μm to 10 μm via using the primary particles as well as a second aggregate of secondary particles each having particle size distribution encompassed within the range of more than 10 μm and equal to 50 μm or less via using the primary particles, wherein the wet-granulation of the second aggregate is performed at a higher drying rate or by using slurry with higher viscosity than the wet-granulation of the first aggregate;

mixing the first aggregate and the second aggregate thus granulated; and preparing an agglomerate of secondary particles, wherein in the secondary particles, a particle size D10, which corresponds to 10% in volume-based undersize cumulative particle size distribution is encompassed within the range from 0.5 μm to 10 μm, and simultaneously a particle size D90, which corresponds to 90% in volume-based undersize cumulative particle size distribution is encompassed within the range of more than 10 μm and equal to 50 μm or less, when analyzed by laser diffraction/scattering particle size distribution measurement; and a mean porosity of the secondary particles having the particle size D90 is higher than a mean porosity of the secondary particles having the particle size D10.

* * * * *